United States Patent [19]

Nagata et al.

[11] Patent Number: 5,072,091

[45] Date of Patent: Dec. 10, 1991

[54] METHOD AND APPARATUS FOR METAL SURFACE PROCESS BY LASER BEAM

[75] Inventors: Itsuo Nagata, Minou; Hiroki Miyamoto, Nara; Kosuke Moriwaki, Sakai; Ichiro Oshima, Amagasaki; Tokihiko Oshima, Amagasaki; Shigekazu Hirata, Amagasaki; Yoshikazu Okano, Amagasaki, all of Japan

[73] Assignees: The Local Government of Osaka Prefecture, Osaka; Osakafuji Kogyo Co., Ltd., Hyogo, both of Japan

[21] Appl. No.: 480,851

[22] Filed: Feb. 16, 1990

[30] Foreign Application Priority Data

Apr. 3, 1989 [JP] Japan .................................. 1-84326
Sep. 5, 1989 [JP] Japan ................................. 1-229567

[51] Int. Cl.$^5$ .............................................. B23K 26/00
[52] U.S. Cl. ........................ 219/121.68; 219/121.69; 219/121.75; 219/121.77

[58] Field of Search ............... 219/121.68, 121.69, 219/121.6, 121.85, 121.73, 121.75, 121.77, 121.8, 121.82, 121.74

[56] References Cited

U.S. PATENT DOCUMENTS

| | | | |
|---|---|---|---|
| 3,463,898 | 8/1969 | Takaoka et al. | 219/121.75 X |
| 3,848,104 | 11/1974 | Locke | 219/121.8 X |
| 4,079,230 | 3/1978 | Miyauchi et al. | 219/121.75 X |
| 4,250,372 | 2/1981 | Tani | 219/121.77 X |
| 4,468,551 | 8/1984 | Neiheisel | 219/121.8 X |
| 4,500,771 | 2/1985 | Miller | 219/121.68 |
| 4,734,550 | 3/1988 | Imamura et al. | 219/121.73 X |

*Primary Examiner*—C. L. Albritton
*Attorney, Agent, or Firm*—Koda and Androlia

[57] ABSTRACT

The method and apparatus for processing metal surfaces by forming the fine irregularity patterns onto metal surfaces in accordance with both of the strong and weak patterns characterized by the interference light on the metal surfaces under the irradiation of the interference light of laser beam onto the metal surfaces is described.

18 Claims, 6 Drawing Sheets

METHOD AND APPARATUS FOR METAL SURFACE PROCESS BY LASER BEAM

BACKGROUND OF THE INVENTION AND RELATED ART STATEMENT

The present invention relates to the method and apparatus to form fine irregularity densely onto the metal surfaces using laser beam. For instance, the present invention may be utilized to give graceful, fluorescent and reflective gloss as patterns or their likes to a part or all of the surfaces of metal accessories, domestic metal electric appliances, industrial metal products and various metal products.

Laser beam is a coherent light having a constant wave length including the same phase and is excel in its directivity. Laser beam can be converged by lenses to concentrate its high energy in a fine spot and has recently been applied to metal cutting, perforating (drilling), welding and so forth.

However, the previous art of the metal process by laser beam bases on the use of the maximum energy density at a focal point to fuse and evaporate metal in a beam spot radius instantly.

Even though a laser beam illuminates as a perfect parallel light from a laser oscillator, it is extremely difficult to condense the laser beam in the order of magnitude of its wave length due to the spreading of the beam by diffraction, the limitation of optical accuracy for light path and the minimum spot radius (several to 10 $\mu$m) which can be converged by condensers. Therefore, the fine irregularity with the depth less than 1 $\mu$m could not be formed on metal surfaces by the previous art of laser technique.

The demand of stainless products has increased in various fields due to the advantages of non-rusting characteristics, mechanical strength and giving a kind of heavy and thick feeling. As their surfaces also give their cold feeling by their original and metal color, various patterns have been tried to be formed by coloring the metal surface while keeping its natural metal gloss more or less. The following method was one of the representative techniques for coloring process. For instance, the surface of a stainless material is masked by a certain synthetic resin and the mask thus formed is taken away by chipping in many stripes' patterns and then immersed in a coloring solution to stain chemically the portion except the masked portion. Subsequently, the remaining masking material is removed away from the proccessed metal surface.

SUMMARY OF THE INVENTION

The previous art as above-mentioned can only give a constant color to metal surfaces and is not a method for a multiple coloring process, by which the surfaces proccessed give the variations of multiple colors in accordance with different angles of observation, namely; the multiple colors demonstrated by rainbow's and fluorescent colors. In addition, the previous art consists of many processes and costs expensive due to many labors and time for coloring.

The present inventors has investigated the technique to change metal surfaces as a whole and/or a portion with patterns in order to give variable colors with the change of angles of observation as well as those of incident light. As a result, we have found that fine irregularity close to visible wave length (1 $\mu$m or less) formed on metal surfaces can spectralize and reflect the incident light as in diffraction grating to give multiple reflective glossy metal surfaces with rainbow's colors. However, such a fine irregularity cannot be formed by the previous technique using laser beam, as above-mentioned. As a matter of fact, even though a focal spot radius may be obtained by process condenser(s), the formation process must be made one by one for each irregularity. It would take enomous time and would also be far from actual application.

First of all, the first object of the present invention is to provide an excellent laser process and its apparatus to form easily dense and fine irregularity on metal surfaces for a short period of time. The present technique is made in a different manner from the previous art.

The second object of the present invention is to utilize laser beam as a coherent light described in the following. It is known that laser beam is a coherent light and becomes an interference light demonstrating its dark and light stripe-like interference patterns which are caused by mutual interference due to its perfect coherent light when plural beams with a same frequency and a constant phase overlap on the other. Therefore, the overlapped beam is converged by condenser(s) and concave mirror(s) and the resulting illumination spot shows an interference stripe pattern at the position before or after the focal point. Then, placing a metal surface in this interference domain and if the light portion in this interference stripe pattern has an enough energy density to fuse and evaporate the metal, a dense irregularity is formed corresponding to the intensity distribution of the interference stripe pattern, namely; the light portion of the stripe pattern gives concave and the dark portion gives covex to the metal surface, respectively.

Even though a single laser beam is utilized and so long as the laser beam is that of a multi-mode containing plural light pattern components, the illumination spot obtained by the condensers can show the interference stripe pattern before and after the focal point by converging also. The interference stripe pattern in the illumination spot consists of several hundreds of fine light and dark stripes in which their mutual intervals are 1 $\mu$m or less and close to visible light wave length. Therefore, the numerous irregular stripes are formed at once on metal surfaces by scanning at one time by displacing the illumination position of the beam coherent light relatively to X direction or Y direction along the metal surfaces. For instance, approximately 300 concave stripes are formed using a YAG laser processor with a medium output. The metal surfaces thus arranged have densely their fine irregularity and have also the reflective gloss which variably changes at any angles of observation to be able to enjoy various rainbow's colors at the angles of incident light as the incident light is spread and reflected like a diffraction grating. On contary, the previous technique to place a metal surface at the focal point of a condenser for proccessing can only provide one groove by one scanning, even though the focal spot radius may be reduced to 1 $\mu$m or so. Therefore, in order to get the same reflective gloss by the present invention, several hundred time scanning as well as enomous time would be neccessary.

In the present invention, the irregularity on metal surfaces is formed corresponding to the interference stripe pattern of a coherent light on metal surfaces and the intensity of the coherent light varies based on metal material and irradiation time per unit area (length).

Accordingly, the output of laser light source, the focal spot radius of the condenser and the deviated distances of the irradiated surface relative to the focal point and so on should be set properly.

The most suitable number of laser beams for their interference or that of the light pattern components in the laser beams should be 2 or 3 at most. As their number increases, the resulting interference stripe pattern becomes more complicated, ambiguous and irregular.

Figure 2:
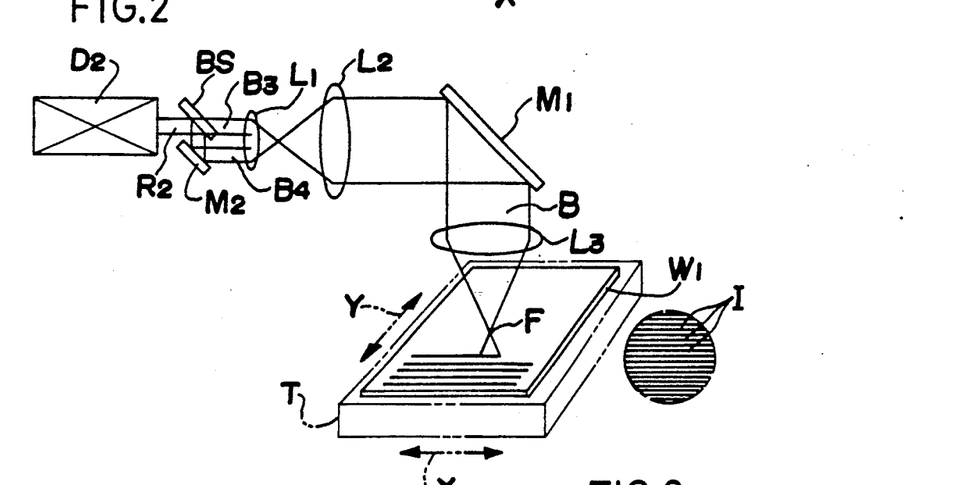
Figure 3:
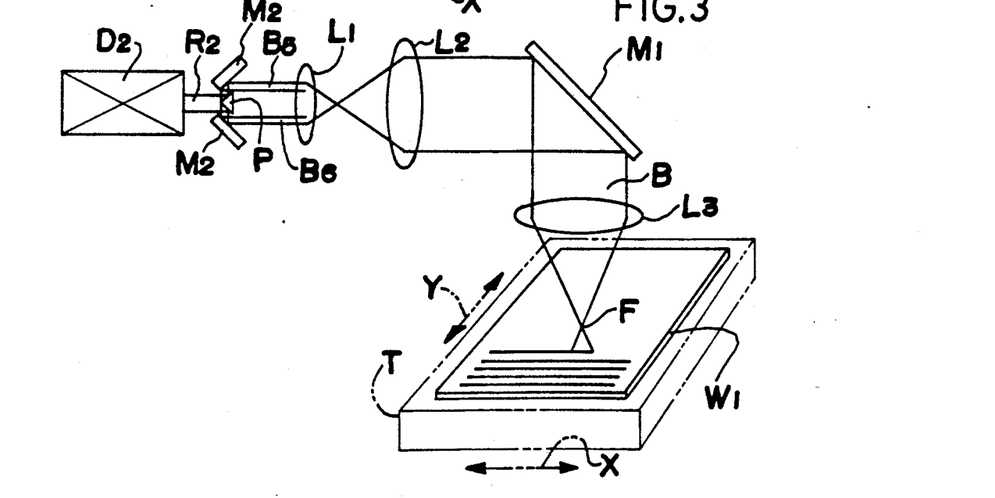
Figure 4:
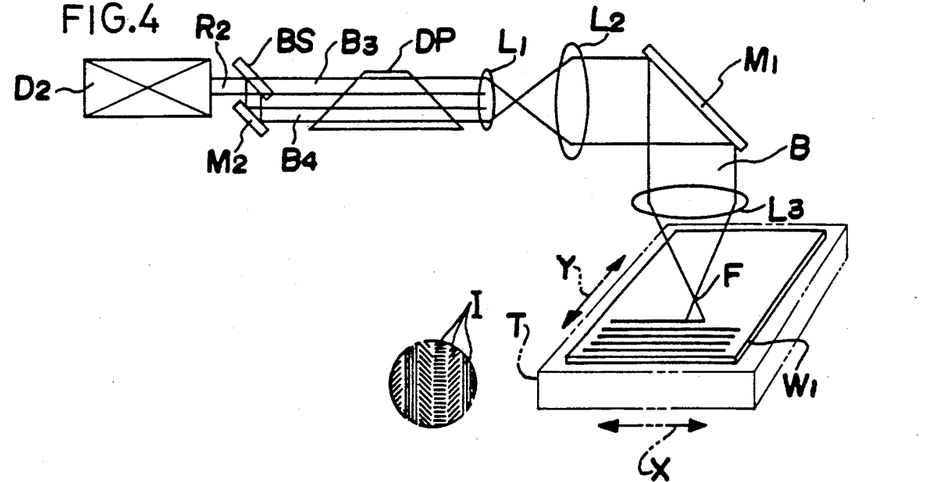

It is neccessary that plural beams should have mutually the same frequency and a certain phase in order to generate their interference. Therefore, it is impossible to use a different laser light source (oscillator) every each beam. In the present invention, it is desirable to use a single laser light source (former) to generate a multimode oscillation or the combination of a single laser light source (latter) and the method to split the resulting single laser light into plural beams. A clear pattern can be obtained using $TEM_{10}$ Mode laser light source for the former and $TEM_{00}$ Mode laser light source for the latter. This is why the $TEM_{10}$ Mode laser light source consists of 2 light pattern components and $TEM_{00}$ Mode laser light source provides a single mode oscillation with its clear interference stripe pattern. There is an easy beam splitting method by splitting a single beam into a transmission light and a reflected light using, for example, a semi-transparent mirror (beam splitter) (FIG. 2) or by splitting it into 2 beams using a spectral prism (FIG. 3). The mutual crossing angles of the resulting beams are set to fit the intervals of the interference stripe pattern to the required interval by optical system. It is also possible to split it into more than 3 beams using plural numbers of the semi-transparent mirrors, weight-type triangle spectral prism and their mutual combination. The method of XY direction displacement to move the illumination position of the coherent light on metal surfaces is attained by displacing the moving portion mounted work piece on or by displacing the coherent light side with the XY scanner of 2 rotating mirrors' combination. It is also desireable to combinate this XY scanner method with the focal point displacement method using Z scanner described later to compensate the beam length to the metal surfaces resulting from the rotating mirror's angles. In case the laser light path is interruptted by an image rotating mirror in the present invention, the direction of the interference stripe pattern changes in accordance with the rotation of the prism, and that of the irregularity of the stripe pattern on the metal surfaces also changes (FIG. 4). Therefore, the colors of the reflected gloss change and become more brilliant corresponding to the angles of observation and the angles of incident light to metal surfaces to provide, as a result, their reflected fluorescent gloss like an opal.

Furthermore, it is possible by using a focal point displacement method that the focal point position is changed in accordance with Z direction position of the illumination surface to the metal surfaces with 3-dimentionally curved shapes and the uniform irregularity is formed on the whole of the processed portion of the metal surfaces under the intensity of the coherent beam on the illumination surfaces. The focal point displacement method is a technique to displace the focal point position in the beam axis direction as a condensing method in the present invention. As a focal point displacement method, it is not necessary to move the converging apparatus itself, but it is enough to displace one of the lenses placing in the light path along the light axis direction. The focal point displacement is operated by measuring the surface shapes of work pieces in advance and by the input of the measured results into the control system to control the displacement to optical axis direction automatically. Z scanner (Dynamic Focus) for laser processing can be applied to this case.

In the present invention and using the apparatus, it is possible to form the patterns blightening like rainbow's colors naturally by drawing various patterns using the illumination portion of the coherent beam onto the metal surfaces. The formation of these patterns can be made by the input of the pattern programs into the control system for XY direction displacement method and/or Z direction displacement method and then by displacing the illuminated domain of the coherent beam to XY direction and/or Z direction automatically on the basis of the signals resulting from the control system.

On the other hand, when a transmission body is placed in the light path consisting of either the split plural laser beams from a single beam or plural light pattern components in the multi-mode laser beam, the information of this 2-dimentional transmission shape is incorporated into the interference stripe patterns and also recorded in the irregularity of metal surfaces. Therefore, the resulting metal surfaces react as a photographic plate of hologram and the transmission shape appears as a holography.

Furthermore, as laser beam is a coherent light with perfect coherency and a portion of laser beam is displaced laterally to right angle direction toward light axis to give a secondary beam component by mutually overlapping the original beam component on the displaced beam component, the overlapped domain of both components on the illumination surface demonstrates light and dark interference stripe patterns corresponding to the phase gradient distribution of the above-mentioned displacement. Therefore, when both of the components are illuminated onto the metal surface at the position preferably deviated before or after the focal point after, the overlapped beam is converged by condensers and concave mirrors. Then, the irregularity of the present interference patterns is given as a concave corresponding to the light portion and as a convex corresponding to the dark portion, namely; corresponding to the intensity distribution of the interference stripe patterns if the light portion has its energy density enough to fuse and evaporate the metal surface.

Figure 12:
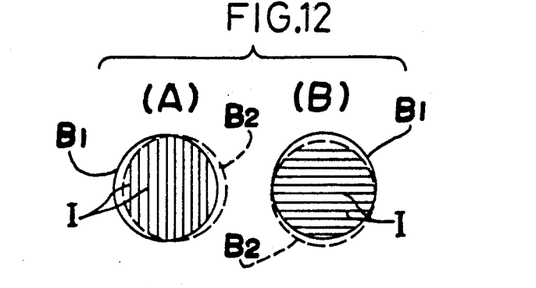

Needless to say, the amount of lateral displacement to form interference stripe patterns is the amount that is excluded from those of $0.5 n$ times $\lambda$ (n: integer number) and the interference stripe patterns or the Groove I direction (as shown in FIG. 12 (A) and (B)) have an orthogonal direction to the lateral displacement direction of the beam component $B_2$ displaced against the original beam component $B_1$.

As the intervals of the interference stripe patterns are displaced by the above-mentioned amount of lateral displacement, the intervals of Groove I can be set by the choice of the amount of displacement arbitarily.

In order to displace laser beam laterally, there are two methods; one is a primary displacement method and the other is a secondary displacement method. The former is done by incorporating the beam displacement means into laser resonators to generate lateral displacement. The latter is done by setting the beam displacement means at the outside of laser resonators to laterally displace the laser beam illuminated from the laser resonators.

As above-mentioned, primary displacement method, there are especially no restrictions in the present invention. The most practical method is done by utilizing Q switch element incorporated in the resonators of solid state laser for Q switch pulse oscillation. The Q switch element QS is fixed to vibrators TD (electric-acoustic tranducer) to one surface of rectangular elastic body S consisting of fused quartz and has a construction with a ultrasonic absorber AS on the other surface (FIG. 2). When a high frequency signal from high frequency signal source RF is applied to the vibrators TD, the vibrators TD generate thickness frequency, which is transmitted through the elastic body S as a ultrasonic longitudinal wave (wave of expansion) and forms a phase lattice G having the same wave length of the ultrasonic wave equivalently on the basis of the periodical reflex variations by photoelasticity effect in the elastic body S.

Figure 11A:
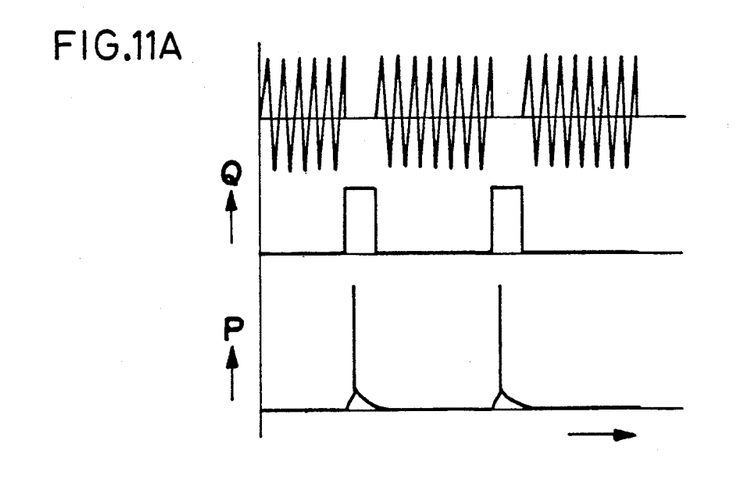
Figure 11B:
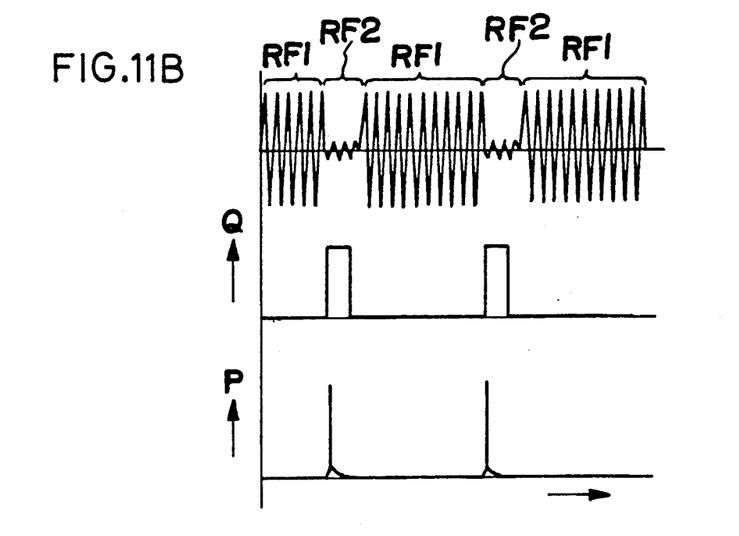

Therefore, as the QS of this Q switch element is placed between reflecting mirrors Ma and Mb on both sides of the laser resonator as shown in the figure so that the resonant axis has the angles to follow Bragg curve against the wave surface of ultrasonics, the laser beam incident light into the elastic body S receives diffraction scattering just like Bragg reflection by crystal lattice and the laser oscillation is surpressed while ultrasonic signals are applied. By the continuous activation during this period, a large pomping distribution is accumulated in the laser medium RM. By stopping the ultrasonic signals at a moment, the energy thus accumulated is released all of the sudden and during an extremely short period of time the laser oscillation elevates to output a pulse laser beam with high density energy, namely; Q switch pulse laser beam. FIG. 11 indicates the correlation of the ultrasonic signals in this general Q switch pulse oscillation, Q values of the laser resonator and the laser oscillation output against time.

In case of applying the Q switch element QS to the present invention, the ultrasonic signals applied to the element QS must not be stopped (zero) and should be left remaining under such an intensity not to stop the oscillation. In other word, while as above-mentioned a weak ultrasonic signal $RF_2$ is applied to the Q switch element QS, a weak phase lattice G remains in the elastic body S. From a resonator $D_1$, a portion of the oscillating laser beam is displaced to emit the overlapped beam $R_1$ of the original beam component with the laterally displaced beam component by the influence from this phase lattice G. The amount of the lateral displacement is chosen arbitarily by the frequency of the ultrasonic signals also. In this case, both of the Q value in the resonator and the laser oscillation output P lowers a little, but there is no effect on metal surface processing.

The intensity of the high frequency signals $RF_2$ to be remained corresponds to approximately 10-15% of that of the high frequency signals $RF_1$ applied to surpress the laser oscillation.

In addition, apart from the Q switch element QS, there are various applicable methods for primary beam displacement, such as birefringence prism, lateral displacement function of the reflective mirrors in resonators and so on.

On the other hand, there is no especial restriction for the beam displacement apparatus which is installed at the outside of laser resonators. There are some methods to be pointed out. For instance, a method utilizing the elements having the same construction with the ultrasonic Q switch element (FIG. 14), a method employing the double reflective mirrors having the partial reflective plane of a surface and the total reflective plane of the back surface (FIG. 15), and a method using a partial transmitted mirror and a total reflective mirror which is accessed to it and placed in parallel (FIG. 16).

In case of applying the method utilizing the elements having the same construction with the ultrasonic Q switch element, the element should be placed in the laser beam light path at the angles to satisfy Bragg curve and then weak ultrasonic signals are applied to the element during laser oscillation. The intensity of the applied signals is of the same order of magnitude with that applied to Q switch element incorporated in the laser resonator. By this application, a portion of the laser beam transmitted through the element of the weak phase lattice formed in the elastic body of the element is laterally displaced and emitted as the coherent light overlapped on the original beam component from the element.

In case of using the methods by the double reflective mirrors and the combination of the partial transmitted mirror and the total transmitted mirror, the component by the partial reflection yields lateral displacement against the beam component by the total reflection on the basis of the light path difference and, therefore, by setting the light path difference in smaller radius than the original beam radius, the reflective beam becomes an interference light given by the overlapping of both beam components.

As shown in the comparison between FIG. 11 (A) and (B), the energy density of the beam decreases in case a portion of laser beam is displaced laterally, and this kind of the energy density decrease should be extremely avoided from the standpoint of laser processing. In the previous art, there are no examples as the present invention has adapted the beam displacement method.

It is evident from the previous explanations that the present invention is suitable for the advantages of laser processing, namely; multiple kinds of products for small production output. Therefore, the third object of the present invention is to proceed effectively the accessory process for various patterns.

It is not neccessary by the present invention that the metal surfaces to be proccessed is even. Even the metal surfaces by crystal cutting and more or less with irregularity can be proccessed. The work piece under proccessing is not required to be fixed firmly and is enough to tack due to non-contact process. The operation is also easy.

Furthermore, the fine irregularity grooves proccessed by the present invention on the metal can be printed on resin surfaces by heat and the subsequent process of aluminuim vapor deposition on the printed resin films can be done to easily produce the accessory film used as wrapping papers. The present invention can be applied to transcription technique as an additional object of the present invention.

BRIEF DESCRIPTION OF THE DRAWINGS

FIG. 11 (A) illustrates the correlation diagram of ultrasonic signal (in the previous operation of ultrasonic Q switch element)-Q value of laser oscillator-laser oscillator output-time.

FIG. 11 (B) shows also the similar correlation diagram in the operation of the present invention.

FIG. 12 (A) (B) demonstrates the plan view of the beam spot illuminated on metal surfaces by the present invention.

DETAILED DESCRIPTION OF RELATED ART AND OF PREFERRED EMBODIMENTS OF THE INVENTION

The present invention was explained on the basis of demonstrated examples.

Figure 1:
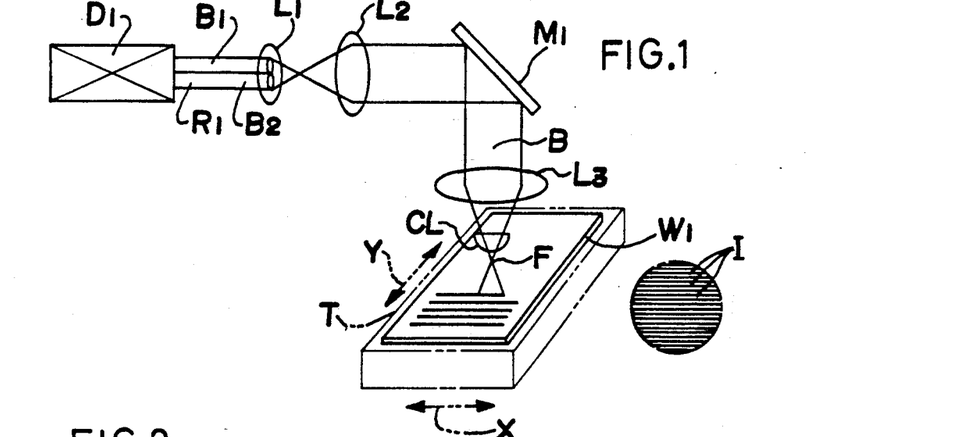
FIG. 1 to FIG. 5 give the schematic construction diagrams of each laser proccessing apparatus corresponding to the first example upto the fifth example. The portions circled with a virtual line in FIGS. 1, 2 and 4 show each enlarged portion formed by each apparatus.

The laser proccessing apparatus of the first example using the laser light source $D_1$ of $TEM_{10}$ Mode was shown in FIG. 1. In this apparatus, the laser light $R_1$ illuminated from the laser light source $D_1$ consisted of 2 components of light pattern $B_1$ and $B_2$, and these components were synthesized by synthesizing lense $L_1$ to give the synthesized beam B, which was enlarged by magnifying lense $L_2$, converted in direction at the angle of 90° by a direction conversion reflective mirror $M_1$, and converged by a condenser $L_3$. The work piece $W_1$ placed on the XY table T was set at a position far from the focal point to be illuminated to Beam B. CL was a cylindrical lense to transform the cross section of a flux, which was directed to become longer in direction of the light pattern components $B_1$ and $B_2$ by setting the lense to clearify the interference pattern much more.

In the above-mentioned construction, the surfaces of work piece $W_1$ were scanned by Beam B by moving XY Table T to X direction. Every one scanning, XY Table T was moved to Y direction by the distance corresponding to the spot beam radius and the scanning was repeated in turn to complete the beam illumination on the whole domain of a partial or whole surface of the work piece $W_1$. As the beam illumination position locates in the interference domain of light pattern $B_1$ and $B_2$ which were far from the focal point F several hundreds pieces of concave stripes I are formed within the width of the illumination spot radius every scanning. They correspond to the light portions of the interference stripe pattern as demonstrated in the enlarged figure circled with a virtual line in FIG. 1.

In details, using YAG laser resonator ($Nd^{3+}$. $Y_3Al_5O_{12}$) as laser light source $D_1$, the laser pulse of $TEM_{10}$ Mode (oscillation wavelength 1.06 μm, pulse width 100 ns, pulse repeat frequency 1 KHz and average output 4 w) was converged by a condensor for process (focal depth 100 mm) $L_3$. The surface of work piece consisting of stainless steel plate $W_1$ was set under the focal point F by 4 mm and the moving rate of XY Table T to X direction was set at 100 mm/m in for processing. The beam spot radius on the illuminated plane became approximately 0.3 mm and about 300 stripes of concave with the mutual intervals and depth of 1μ, respectively, were formed within the width of 0.3 mm every each scanning. The surface of the work piece proccessed by illumination presented various reflective gloss with rainbow color either in the sun light or a room lamp light, and these colors varied variously at illumination directions and at the angles of observation.

The laser proccessing apparatus of second example was shown in FIG. 2 and utilized $TEM_{00}$ Mode, namely; single mode laser as a light source $D_2$. In this apparatus, the laser beam $R_2$ illuminated from laser light source $D_1$ was split by a semi-transmitted mirror with 50% transmission into a transmitted beam $B_3$ and a reflected beam $B_4$. The Beam $B_4$ was converted in direction at 90° and synthesized with $B_3$ by a synthesizing lense $L_1$ to give Beam B, which was transferred by way of magnifying lense $L_2$ and a reflective mirror $M_1$ to condense by a condenser for processing $L_3$ as shown in the first example. The work piece $W_1$ was set on XY Table T and the surface of the work piece $W_1$ was illuminated by Beam $B_3$ and $B_4$ of the interference light as shown in the first example. Several hundreds pieces of the concave stripes were formed corresponding to the light portions of the interference patterns just like the first example as shown in the enlarged figure circled in FIG. 2.

The laser proccessing apparatus of the third example using 45° spectral prism P was shown in FIG. 3, and had the same composition with the second example except laser split portion. In this case, the laser light $R_2$ of $TEM_{00}$ Mode illuminated from laser light source $D_2$ was split by prism P into the reflective beam $B_5$ and $B_6$ in 2 direction and the resulting both beams were converted in direction by a reflective mirror, respectively, to be synthesized by a synthesizing lense $L_1$ and then to be illuminated as an interference light on the surface of the work piece $W_2$ by way of the similar light path as shown in the second example for the similar proccessing.

Furthermore, it was possible that the laser beam was split into 3 beams using 2 pieces of semi-transmitted mirror BS in the second example or a triangle weight-type prism as prism P in the third example.

The laser proccessing apparatus of the fourth example was shown in FIG. 4 and an image rotating prism DP was placed in the light path before the synthesizing lense $L_11$. The composition was same with that in the second example except the image rotating prism DP. In this case, the direction of the interference stripe pattern from Beam B varied in time with the rotation of the prism DP. Therefore, for instance, by intermittently turning the prism DP during each scanning, the group of the concave stripes I having a different direction was formed in turn on the surface of the work piece $W_1$ as shown in FIG. 4 and also by continuously turning the prism DP, the concave stripes I became continuous wave shapes. In the figure, although the laser light $R_2$ was illuminated from laser light source $D_2$ of $TEM_{00}$ Mode laser light source $D_2$ and split by semi-transmitted mirror BS, the same irregularity proccessing could be done by placing the image rotating prism DP in the light path in case the spectral prism as shown in the third example was used as a beam splitting means and the laser light source $D_1$ of $TEM_{10}$ Mode was also used as shown in the first example. The incident light on the surface of work piece proccessed by this proccessing apparatus was reflected variably to give its reflective gloss like an opal.

Figure 5:
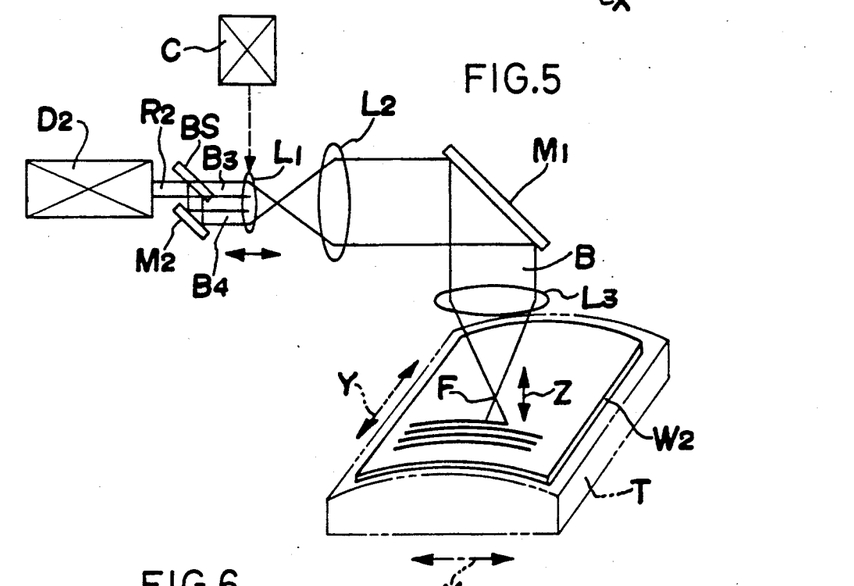

The laser proccessing apparatus for the fifth example was shown in FIG. 5 and applicable to the work piece whose surces were curved. In this apparatus, the synthesizing lense $L_1$ was moveable in the direction of the light axis and the focus F of the condenser for proccessing $L_3$ moved in the direction of the light axis, namely; z direction, as the synthesizing lense $L_1$ moved. Therefore, the surface shapes of work piece $W_2$ was measured in advance and the resulting information was input into the control system C. By displacing the lense $L_1$ automatically by the control system C corresponding to Z direction of the surface of work piece $W_2$ at the illumination position of Beam B, the intensity of the interference light on the illumination plane was always maintained at constant to operate a uniform irregularity proccessing. Also, the condenser for proccessing $L_3$ itself might be displaced in the place of the synthesizing lense $L_1$. Moreover, such a focus displacement method could be applied to either of the apparatus in the first example upto the fourth example.

Figure 6:
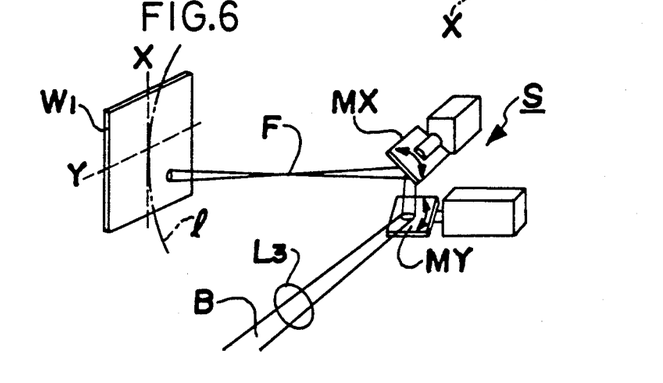
FIG. 6 indicates the schematic strabismus diagram of the main portion for the example using XY scanner.

An example was shown in FIG. 6 and the displacement toward XY direction at the illumination position of beam interference light was operated by the beam side using a XY scanner S, which had a rotating mirror MX for X direction displacement and a rotating mirror MY for Y direction displacement. As the illumination position to the surface of work piece $W_1$ by the focused beam through the lense $L_3$ for proccessing was displaced by the rotation of the rotating mirror MX and also displaced to Y direction by the rotation of the rotating mirror MY, the work piece could be scanned in a fixed condition. In this case, as the beam length reflected by the rotating mirror MX was equal on the sphere as a center of the reflective point as a virtual line l, the distance from the focal point F varied by the ilumination position for the work piece $W_1$ with even surface as shown in the figure as an example when the scanning was done in either of XY directions. This variations could be corrected by controlling the displacement of the focal point F position in the combination with the focal displacement method as shown in the fifth example. The beam scanning apparatus combined with XY scanner and Z scanner is available in market and could be applied for this purpose.

Figures 7, 8:
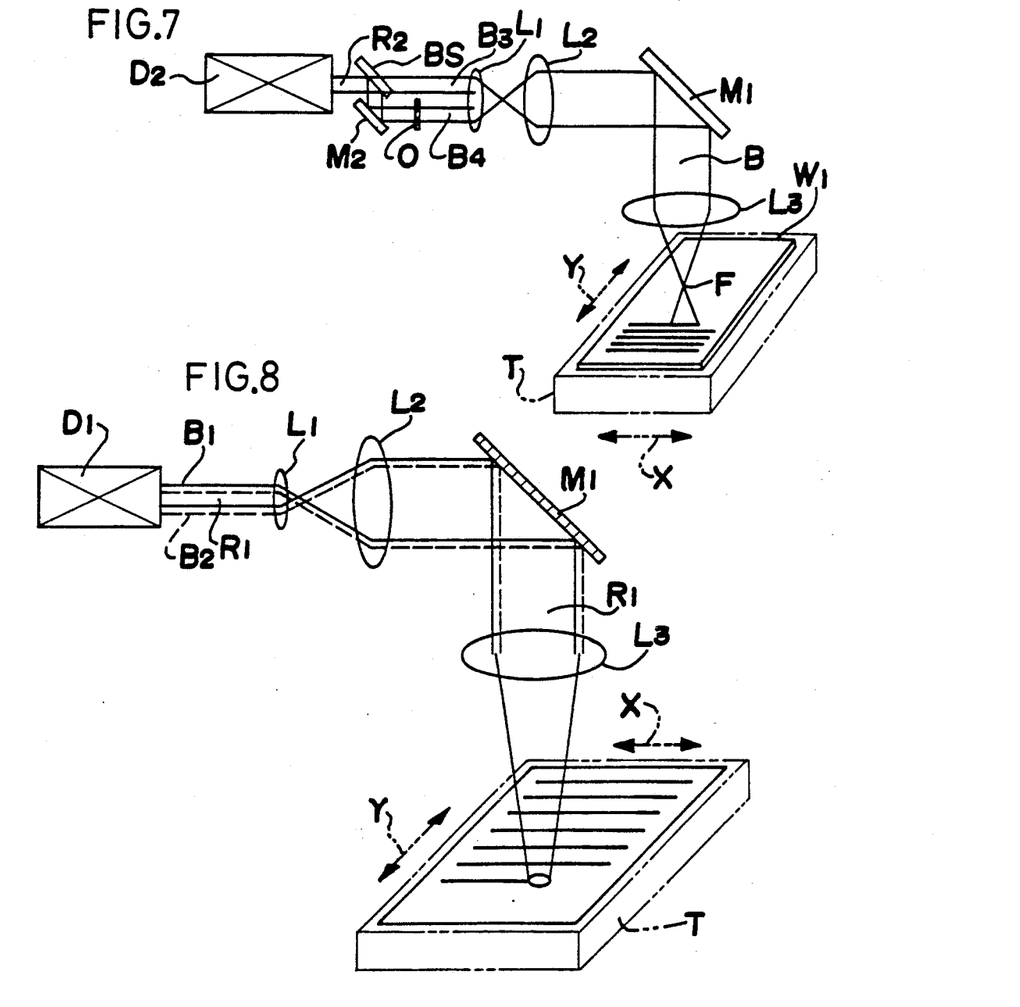
FIG. 7 gives the schematic construction diagram of the apparatus for an example utilizing holography.
FIG. 8 shows the schematic construction diagram of the laser processing apparatus for the sixth example in the present invention, and FIG. 9 also gives the schematic construction diagram of the laser resonator used in the apparatus.

The transmitted body O was placed in the light path of Beam $B_4$ in 2 Beam $B_3$ and $B_4$ split from laser light $R_2$ of $TEM_{00}$ Mode and shown in FIG. 7 as an example. In this case, as the information of 2-dimentional transmitted shapes of the transmitted body O was included in the interference pattern of the interference light synthesized, the above-mentioned information was recorded on the surface of work piece as irregularity. As this corresponded to the photographic film of hologram, the above-mentioned shapes were reproduced in the reflective gloss of the surface. For instance, if the shape is a triangle, a triangle shape imaged up in the reflective gloss.

Therefore, by selecting the transmitted body O, the metal products attached with extremely different accessories could be presented and the accessories appeared as a holography of various shapes in the reflective gloss with rainbow's colors. Of course, the appearance of the similar holography was possible by placing the transmitted body in the light path of either $B_1$ or $B_2$ of the light pattern components in the first example in FIG. 1.

In the present invention, the construction of optical system shown in the examples can be changed variably. For instance, a concave mirror can be used in stead of focusing lense $L_3$ as shown in each example. Although a magnifying lense $L_2$ and a reflective mirror $M_2$ for direction conversion were used in the examples, the magnifying lense $L_2$ could be omitted depending on the focal depth of the synthesizing lense $L_1$ and the condenser $L_3$ for processing. The reflective mirror $M_2$ was omitted and the work piece was placed on the light axis of the laser light illuminated from the laser light source. The beam direction could be converted dimentionally using plural reflective mirrors $M_2$.

In the method proccessed by laser as shown in the above-mentioned each example, thermochemical reactions activated by laser could be used. The process of metal surface in the atmosphere of the reaction gases can be done with less laser output in comparison with that in the air.

In addition, when the proccessed metal surfaces are damaged, the reflection efficiency of the fine irregularity decreases. Furthermore, when the proccessed metal surfaces are damaged, the reflection efficiency of the fine irregularity decreases and therefore a transparent oxide coating film may be used for the duration of the proccessed metal surfaces. For instance, the metal surfaces may be coated with the oxide film by alumina sputtering.

The metal surfaces with fine irregularity proccessed by the present invention may be utilized for transcription mold. For example, alumina vapor deposition on plastic surfaces transcripted with irregularity may give accessory film for wraapping papers.

In the present invention, the laser oscillators as laser light source are not especially limited and may preferably illuminate their coherent laser light. For instance, there are some lasers except YAG laser as shown in the examples. Ruby laser, solid state laser, $CO_2$ laser and gas lasers are available for use. Especially, it is preferable that laser light has pulse oscillation.

FIG. 8 illustrates the laser proccessing apparatus for the sixth example in the present invention. In the apparatus, the laser light $R_1$ illuminated from the laser resonator $D_1$ became the overlapped interference light of beam component $B_1$ and laterally displaced beam component $B_2$. This beam $R_1$ was enlarged by lense $L_1$ and $L_2$ and then converted in direction at 90° by reflective mirror $M_1$ for direction conversion. The resulting light was converged by converging lense $L_3$ and then illuminated to the work piece W on XY table T.

In the above-mentioned construction, the surface of the work piece was scanned by laser beam $R_1$ and by moving XY table T to X direction. Every scanning, XY table T was moved to Y direction by the distance corresponding to the spot beam radius and the scanning was repeated in turn to complete the beam illumination on the whole domain of a partial or whole surface of the work piece W. As laser beam $R_1$ was the overlapped beam of beam $B_1$ and $B_2$, the interference stripe patterns as shown in FIG. 12 (A) or (B) are generated in the polymerized domain of both beams $B_1$ and $B_2$ on the metal surfaces and every scanning several hundreds concave stripes I were formed corresponding to the light portions. FIG. 12 (A) shows the case both beam components $B_1$ and $B_2$ displaced laterally, and FIG. 12 (B) shows the case they displaced longitudinally.

Figure 9:
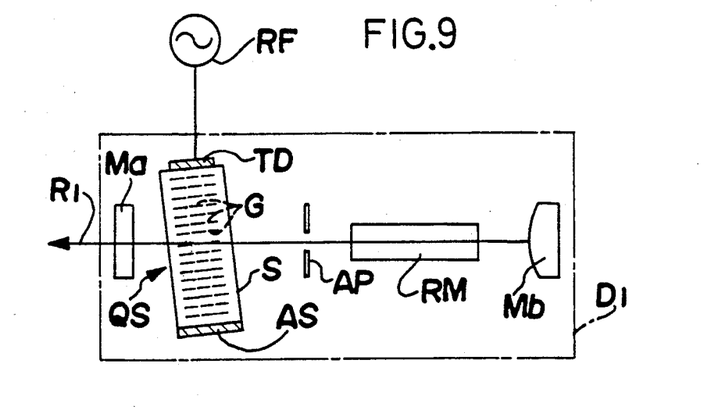

FIG. 9 gives the construction examples of laser resonator $D_1$ in the sixth example. In this resonator $D_1$, there are ultrasonic Q switch element QS, aperture AP, Nd: YAG rod (medium of solid state laser) RM from illumination side along the laser resonant axis and between reflective mirror Ma on illumination side and the other mirror Md on the opposite side. As you know, the above-mentioned the Q switch element QS is fixed to one surface of rectangular elastic body S consisting of fused quartz (a pizoelectric transducer TD being connected to ultrasonic signal source RF locating at the outside is also fixed to it) and has a construction with a ultrasonic absorber AS on the opposited surface. A high frequency signal from high frequency signal source RF is converted into ultrasonic wave by the pizoelectric transducer TD to form a phase lattice G having the same interval of the wave length of the ultrasonic wave on the basis of the periodical reflex variations by the ultrarsonic wave passing through the elastic body S. The resonant axis is set against the wave surface of the ultrasonic wave in order to follow Bragg curve.

Therefore, $D_1$, by applying ultrasonic signals to Q switch element QS in the resonator $D_1$, the laser light receives diffraction scattering and the laser oscillation is surpressed and by the continuous activation during the period of time, a large pomping distribution is accumulated in the laser medium RM. Then, by stopping ultrasonic signal as shown in FIG. 11 (A), the laser oscillation elevates during an extremely short period of time and can give the output of Q switch pulse laser light.

However, in the present invention, the ultrasonic signals should not be zero during laser oscillation and 10–15% of the signal intensity should be left remaining as shown in FIG. 11 (B). As a result, a portion of the laser beam under oscillation receives the influence of the weal phase lattice G left in the elastic body S and is displaced to illuminate the overlapped Beam $R_1$ of the original beam component $B_1$ from the resonator $D_1$ on the laterally displaced Beam component $B_2$.

Figure 10:
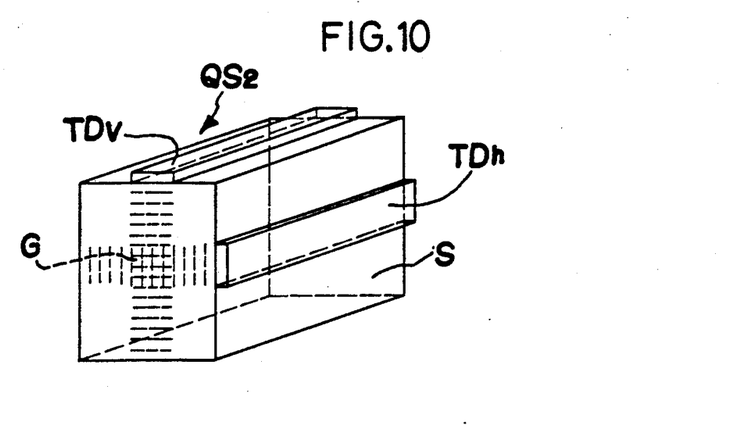
FIG. 10 indicates the strabismus diagram illustrating an example of the ultrasonic Q switch element incorporated in the resonator.

As some examples of these Q switch element QS, there are two types: one is a one-directional type of Q switch element by applying ultrasonics from one direction. The other is a two-directional type of Q switch element $QS_2$ having oscillators TDv and TDh, respectively, on the surfaces adjourning the elastic body S as shown in FIG. 10. In the one-directional type of Q switch element, the scattering loss of laser light strongly depends on the polarized light of incident light. For instance, in Nd: YAG laser, the scattering loss of the light having its' parallel plane of polarization to the progressing direction of ultrasonic oscillation is by 5 times more than that of the light having a vertical plane of polarization. As the ultrasonics progress from two directions (H and V directions) crossing at right angles in the two directional type of Q switch element $QS_2$, a large scattering loss with no dependence on the plane of polarization can be obtained.

In case the two directional type of Q switch element $QS_2$ is utilized as a beam displacement method in the present invention, it is desirable that the ultrasonic signal $RF_2$ to be left remaining during laser oscillation is obtained by setting one of the two directions at zero. This becomes convenient in case giving a groove process corresponding to interference stripe patterns in the present invention, because perfect linear interference stripe patterns is easily formed by constructing the polarized light with a linearly polarized light only. In case using this two directional type of Q switch element $QS_2$, groove I is formed by setting directions of the vibrator TDv (V direction) and TDh (H direction) and the resulting groove's direction becomes at 90°. Therefore, the direction of groove I can be selected.

Figure 13:
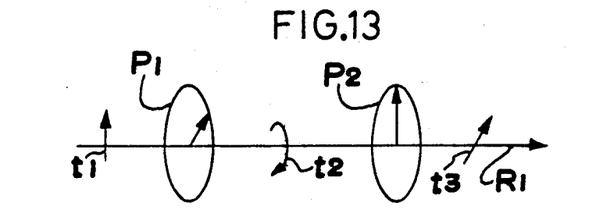
FIG. 13 illustrates the explanatory drawing for the variations of laser beam polarization interrupted by a ¼ wave length board.

On the other hand, in case Q switch element QS is of one directional type, comined with 2 pieces of ¼ wave length plates $P_1$ and $P_2$, an initial linearly polarized light $t_1$ is converted into circular polarized light $t_2$ by the first ¼ wave length plate $P_1$ and then reconverted into $t_1$ by the second ¼ wave length plate $P_2$. Therefore, the linearly polarized light $t_3$ can be set in an arbitary direction by turning the second ¼ wave length plate $P_2$ and the direction of the groove I corresponding to interference stripes can be selected arbitarily.

In details, YAG ($Nd^{3+}.Y_3Al_5O_{12}$) laser oscillator having a replaceable two directional type Q switch element $QS_2$ as a laser resonator $D_1$ was used. 40M Hz and 20 W and 40M Hz and 5 W of high frequency signals were applied to the vibrator TDh (H direction) and TDv (V direction), respectively. The high frequency signal of 2–3 W was left remaining in the vibrator TDh and that for the vibrator TDv was set to stop (zero). Q switch pulse laser beam (oscillation wave length 1.06 $\mu$m, pulse width 100 ns, pulse repeating frequency 1K Hz and average output 4 W) was converged by a condenser $L_3$ for proccessing with depth of focus of 100 mm. The surface of work piece of stainless steel plate was placed above the focal point by 4 mm and processed by moving XY table T to X direction at 100 mm/min. The resulting beam spot raduis became about 0.3 mm and 300 stripes of the groove I having their mutual interval and depth of about 0.95 $\mu$m, respectively, within the width of 0.3 mm every scanning. The surface of the completed work piece showed brilliant reflective gloss with rainbow's colors and their colors were varied by illuminated directions and at the angles of observation. When the setting of high frequency signals against the vibrators TDh and TDv of the above-mentioned element $QS_2$ was reversed, the direction of the groove I became accordingly reversed.

Figure 14:
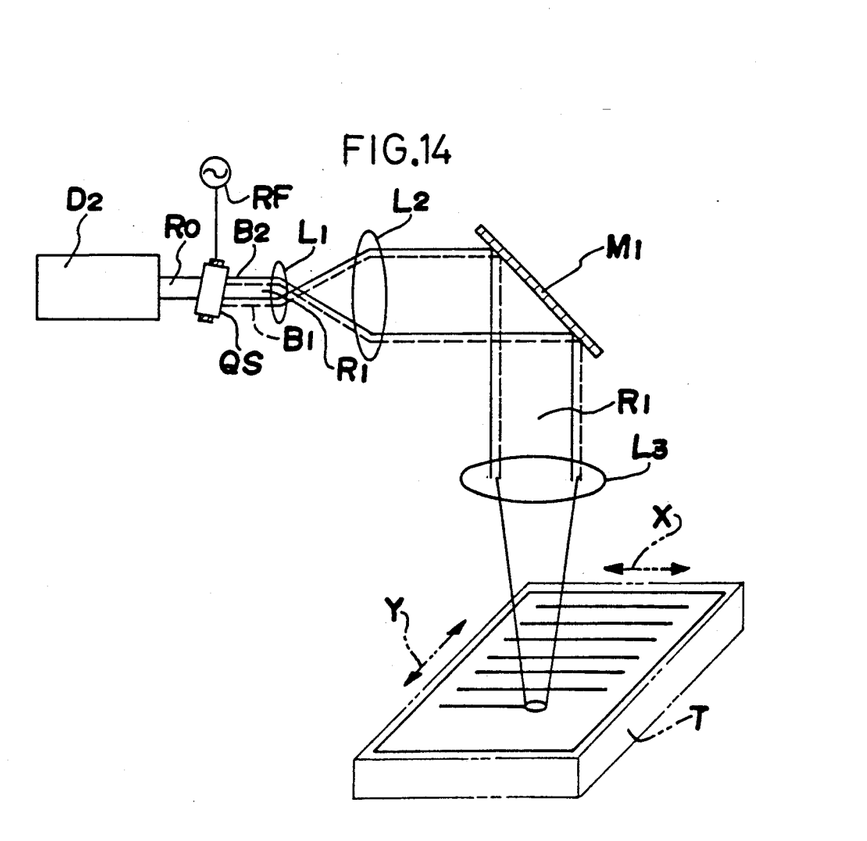
FIGS. 14, 15 and 16 give the schematic construction diagrams of each laser proccessing apparatus for the seventh example to the nineth examples in the present invention.

FIG. 14 demonstrates a laser processing apparatus for the seventh example utilizing a general laser resonator $D_2$ whose medium is solid or gas state. In this apparatus, the ultrasonic Q switch element and the element QS having the same structure in the above-mentioned sixth example were placed in the light path of the laser beam $R_0$ ejected from a laser resonator $D_2$. This element QS was placed so that the incident light of Beam $R_0$ may satisfy Bragg curve against the wave surface of ultrasonics generated by applying high frequency signals from the high frequency signal source RF.

In the apparatus for the seventh example, a weak high frenquency signal was applied to QS at the same level with that applied to during laser oscillation for the above-mentioned sixth example intermittently. A part of the incident laser beam $R_0$ was laterally displaced by the resulting influence of the weak diffraction lattice formed in the element QS and was illuminated as the overlapped interference light Beam $R_1$ consisting of the original beam component $B_1$ and the displaced beam component $B_2$. This beam $R_1$ was passed through lenses $L_1$ and $L_2$, reflected by reflective mirror $M_1$, converged by converging lense $L_1$ and illuminated on the metal surface of work piece W to process fine groove corresponding to the similar interference stripes as above-mentioned.

Figure 15:
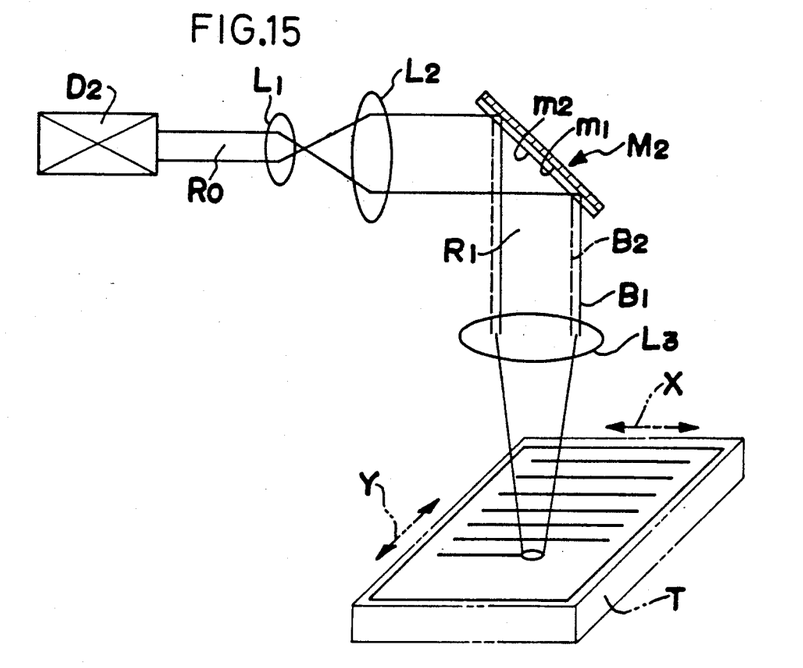
Figure 16:
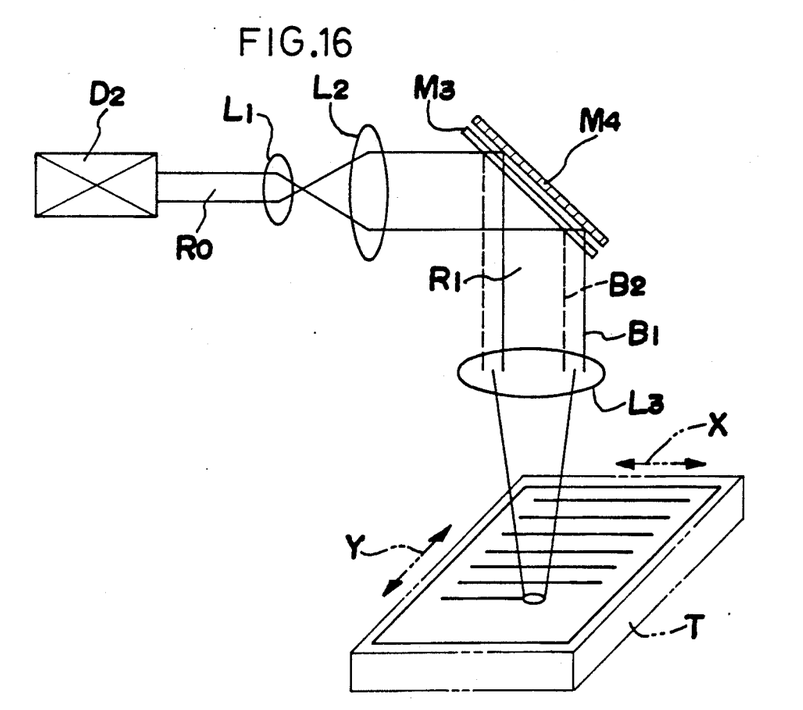

FIGS. 15 and 16 illustrate laser processing apparatus for the eightth and ninth examples using a general laser $D_2$ in similar with the seventh example. In the apparatus of the eightth example, a double reflective mirror $M_2$ having a partial reflective plane $m_1$ and the total reflective plane $m_2$ on the back plane was placed at the place of the reflective mirror $M_2$ for converting direction for the apparatus for the sixth and seventh examples. In the apparatus for the ninth example, there were a partial transmitted mirror $M_3$ and a total reflective mirror $M_4$ placed in parallel on its back side at the same position as above-mentioned.

In the apparatus for the eightth and ninth examples, the enlarged laser beam R by way of the lenses $L_1$ and $L_2$ from the laser resonator $D_2$ was converged by the converging lense $L_3$ and illuminated on the metal surface of work piece. Therefore, the interference stripes were formed in the overlapped domain of both beam components $B_1$ and $B_2$ to form fine groove proccessing corresponding to the interference stripes on the metal surface. The direction of the groove was set turning the mirror $M_2$ or $M_3$ and $M_4$, and the depth of the groove was set by the distance between both reflective planes $m_1$ and $m_2$ or that between the mirrors $M_3$ and $M_4$.

In the sixth to ninth examples, the illuminated position by the converging lense $L_3$ was set before the focal point of the lense $L_3$, but could be set after the focal point to perform the similar fine groove proccessing.

We claim:

1. Laser processing method for metal surfaces comprising:
   an illuminating a metal surface of a workpiece by interfering light of a laser beam, producing interference patterns on the illuminated metal surface, and forming fine ridges and furrows corresponding to an intensity distribution of the interference patterns.

2. Laser processing method for metal surfaces shown in claim 1 wherein said interfering light is produced by the mutual overlapping of bright pattern components in a laser beam of multi-mode.

3. Laser processing method for metal surfaces described in claim 1 wherein said interfering light is produced by the overlapping of two or more beams into which a single laser beam is split.

4. Laser processing method for metal surfaces described in claim 1 wherein a portion of the laser beam is laterally displaced, and the interfering light is produced by the overlapping of an original beam component and the laterally displaced beam component.

5. Laser processing method for metal surfaces described in claim 4 wherein an ultrasonic Q switch element is incorporated in a resonator of a solid state laser and a portion of the laser beam is displaced laterally on condition that high frequency signals applied to the Q switch element remain, when the laser beam is generated, at an intensity not to stop the generation of the laser beam.

6. Laser processing method for metal surfaces described in claim 2, 3, 4 or 5 wherein a 2-dimensional transmittable body is placed in any one of the light paths of bright pattern components in the multi-mode laser beam and of the light paths of two or more beams produced by splitting or displacing a single laser beam.

7. Laser processing apparatus for metal surfaces comprising a laser beam light source of multi-mode oscillation, a concentrating means to cause the laser beam to converge, a workpiece placement means to position a metal surface of a workpiece in a domain of light interference deviated far and near from a focal point of the concentration means, and a XY direction displacement means to displace relatively a XY direction illumination position of an interfering light of the laser beam against the metal surface.

8. Laser processing apparatus for metal surfaces comprising a laser beam light source, a beam splitting means to split a single laser beam from the light source into two or more beams, a concentrating means to cause the split beams to overlap and converge, a workpiece placement means to position a metal surface of a workpiece in a domain of light interference deviated far and near from a focal point of the concentrating means, and a XY direction displacement means to displace relatively a XY direction illumination position of an interfering light of the laser beam against the metal surface.

9. Laser processing apparatus for metal surfaces described in claim 8 wherein the beam splitting means is a semitransparent mirror.

10. Laser processing apparatus for metal surfaces described in claim 8 wherein the beam splitting means is a dispersive prism.

11. Laser processing apparatus for metal surfaces described in claim 7, 8, 9 or 10 wherein an image rotating prism is placed in a light path of the laser beam.

12. Laser processing apparatus for metal surfaces described in claim 7 or 8 wherein the XY direction displacement means is one adapted to move the workpiece.

13. Laser processing apparatus for metal surfaces described in claim 7 or 8 wherein the XY direction displacement means is a XY scanner comprising two rotating mirrors in combination with one an other.

14. Laser processing apparatus for metal surfaces described in claim 7 or 8 including a focus displacement means to displace a focus position on the principal axis of the concentrating means.

15. Laser processing apparatus for metal surfaces comprising a laser resonator, a beam lateral displacement means, placed in a light path of a laser beam from the resonator, to displace a portion of the beam laterally so as to produce an interfering light by the overlapping of the laterally displaced beam component and an original beam component, a beam concentrating means to cause the interfering light to converge so as to illuminate the metal surface of the workpiece with the interference deviated far and near from a focal point of the beam concentrating means, and a illumination position displacement means to relatively displace the illumination position of the interfering light in a XY direction.

16. Laser processing apparatus for metal surfaces described in claim 15 wherein the beam lateral displacement means is an element having a construction similar to an ultrasonic Q switch element.

17. Laser processing apparatus for metal surfaces described in claim 15 wherein the beam lateral displacement means is a double reflective mirror having a partially reflective plane of the front surface side and a totally reflective plane of the back surface side of the mirror.

18. Laser processing apparatus for metal surfaces described in claim 15 wherein the beam lateral displacement means comprises a partially reflective mirror and a totally reflective mirror adjacent to and in parallel with one another.

* * * * *